United States Patent Office 2,737,447
Patented Mar. 6, 1956

2,737,447

DIBORANE PREPARATION

John R. Elliott, Schenectady, N. Y., assignor to General Electric Company, a corporation of New York No Drawing. Application June 14, 1950,
Serial No. 168,173

4 Claims. (Cl. 23—204)

The present invention relates to a method of preparing diborane and the product thereby obtained.

In accordance with a known method of preparing diborane, lithium hydride is reacted with boron fluoride in ethyl ether solution. Based on the equation $$6LiH + 2BF_3 \xrightarrow{Et_2O} 6LiF + B_2H_6 \tag{1}$$

the yield of diborane has generally been in the neighborhood of 25 per cent of the theoretical (based on the boron fluoride reactant). It has been found that when the reaction was carried out at normal atmospheric pressures and at the reflux temperature of ether in the absence of any catalyst, the reaction more nearly follows the equation $$6LiH + 8BF_3 \xrightarrow{Et_2O} B_2H_6 + 6LiBF_4 \tag{2}$$

which accounts for the low yield of diborane based on Equation 1.

The present invention is based on the discovery that, by substituting tetrahydrofuran for the ethyl ether, the course of the reaction between lithium hydride and boron fluoride is caused to follow that shown by Equation 1 with the result that much larger yields of diborane can be obtained.

In the practice of the present invention, a boron halide, as such or in the form of boron halide tetrahydrofuranate, is added to a slurry of lithium hydride in tetrahydrofuran. An exothermic reaction starts immediately but diborane is not evolved until three-fourths of the boron halide has been added. At this point the reaction changes sharply to endothermic. During the initial stages the reaction mixture is heated externally to reflux temperature. If this is not done, runaway conditions may occur. The reaction mixture is then refluxed if desired at the end of the run to complete the removal of diborane. Yields of diborane substantially higher than those obtained with diethyl ether are consistently obtained. While boron fluoride is preferred, boron chloride can be substituted for the fluoride in this preparation of diborane.

It is believed that the improved yields of diborane result from the fact that tetrahydrofuran is a much better solvent for diborane than are other ether type solvents including diethyl ether. As a result, there initially accumulates in the tetrahydrofuran solution of the reactants a sufficient concentration of diborane to cause a reaction thereof with the lithium hydride to form significant quantities of lithium borohydride, $LiBH_4$. This intermediate product is soluble in the tetrahydrofuran and reacts with either boron fluoride or the lithium borofluoride product of Equation 2 to give the improved yields of diborane under Equation 1. The reaction with the lithium borofluoride which is the final product of Equation 2 can be represented by Equation 3

$$3LiBH_4 + LiBF_4 \xrightarrow{Et_2O} 2B_2H_6 + 4LiF \tag{3}$$

These conclusions are supported by experiments showing that lithium borohydride and lithium borofluoride react readily in tetrahydrofuran while lithium hydride and lithium borofluoride are unreactive in tetrahydrofuran, as in ether. The solubilities of certain of the materials involved in these reactions in tetrahydrofuran and ethyl ether are given in Table I.

TABLE I

|  | G. solute per 100 g. solvent at 25° C. ||
|---|---|---|
|  | Tetrahydrofuran | Diethyl ether |
| $B_2H_6$ | [1] 8.1 | [1] 1.1 |
| $LiBF_4$ | 71 | 1.9 |
| $LiBH_4$ | 28 | 3 |
| $LiF$ | 0.6 | ins. |

[1] At 20° C., 1 atmosphere diborane.

In order that those skilled in the art may better understand how the present invention may be carried into effect, the following specific examples are given by way of illustration.

*Example 1*

Boron fluoride, 1.44 mols, in the form of boron fluoride tetrahydrofuranate obtained by dissolving boron fluoride gas in tetrahydrofuran, was slowly added to a slurry of 3 mols lithium hydride in 140 cc. tetrahydrofuran in a vessel equipped with a reflux condenser. The slurry was maintained at reflux temperatures during the addition of the boron fluoride by external heating as required. The reaction was exothermic during the addition of about three-fourths of the boron fluoride. Approximately half of the diborane was collected during addition of the last fourth of the boron fluoride complex. The remainder of the diborane was collected during two hours reflux following the addition of all of the boron fluoride to give a total yield of diborane, 69.5% of the theoretical based on the boron fluoride reactant in Equation 1. A strong odor of diborane over the tetrahydrofuran suspension of residues indicated the presence of dissolved diborane.

To effectively avoid uncontrollable surge conditions, the reaction mixture should preferably be maintained at reflux temperatures at least during the early stages of addition of boron fluoride. Best results in this regard are attained when reflux conditions are maintained during the addition of at least about three-quarters of the boron fluoride tetrahydrofuranate calculated as necessary for the reaction of Equation 1 allowing for a slight excess of lithium hydride. When a saturated or substantially saturated solution of diborane in tetrahydrofuran is the desired final product, the reaction temperature may be lowered during the addition of the final portion of boron fluoride or all or part of the reflux period subsequent to the addition of the boron fluoride eliminated.

It is believed that the higher reaction temperatures required during the addition of the boron fluoride tetrahydrofuranate as compared with the known diethyl ether process are due to the greater stability of the tetrahydrofuranate as compared with the boron fluoride diethyl etherate. Unless the boron fluoride tetrahydrofuranate is caused to react with the lithium hydride at least with the formation of intermediates such as lithium borohydride during the early stages of the reaction, unreacted boron fluoride complex accumulates in the reaction mixture to such as concentration that the ensuing reaction cannot be readily controlled.

Due to the high solubility of diborane in tetrahydrofuran, the concentrated or substantially concentrated solution obtainable as a result of the present process can be employed as such for fuel purposes or for storage of the diborane at low pressure, the diborane being separated by distillation as required. For such purposes, the insoluble residues, such as lithium fluoride, remaining after the reaction has proceeded to the extent necessary to form the desired solution of diborane are simply separated by filtration.

*Example 2*

Boron chloride gas, 0.72 mols, from a storage cylinder was slowly added to lithium hydride, 2 mols, in 200 ml. of tetrahydrofuran. Reflux temperature maintained itself without external heating until eighty per cent of the theoretical boron chloride had been added. The temperature dropped steadily during addition of the remaining boron chloride and no diborane was evolved until the reaction mixture was brought to reflux temperature by external heating. Yield of diborane was 56 per cent with purity slightly less than in the boron fluoride reaction.

From the above description, it will be seen that there has been provided a process for obtaining markedly improved yields of diborane by the reaction of lithium hydride and a boron halide in the absence of catalytic additions or conditions. It is to be understood, however, that the invention is not so limited and that known catalysts for the reaction can be employed if desired. It is further understood that the reaction can be carried out under superatmospheric conditions without departing from the spirit of the invention.

In addition to the above mentioned advantages, particularly as compared with the known diethyl ether process, the present process has the additional feature of involving a less inflammable and hence less hazardous reaction medium. Also, because of the greater solubility of the intermediates in the tetrahydrofuran, a relatively smaller amount of solvent is required for carrying out the reaction between given quantities of the lithium hydride and boron halide.

What I claim as new and desire to secure by Letters Patent of the United States is:

1. The method of preparing diborane which comprises effecting reaction between lithium hydride and a boron halide in the presence of tetrahydrofuran while maintaining the reaction mass at substantially reflux temperatures during at least the first part of the reaction period.

2. The method of preparing diborane which comprises slowly adding a boron halide to a slurry of lithium hydride in tetrahydrofuran while maintaining the slurry at reflux temperatures during the addition of at least a major portion of the halide.

3. The method of claim 2 wherein the boron halide is boron chloride.

4. The method of claim 2 wherein the boron halide is a boron fluoride tetrahydrofuranate.

References Cited in the file of this patent

UNITED STATES PATENTS

| | | |
|---|---|---|
| 2,461,661 | Schlesinger et al. | Feb. 15, 1949 |
| 2,468,260 | Gibb | Apr. 26, 1949 |